United States Patent
Hung et al.

(10) Patent No.: US 11,336,109 B2
(45) Date of Patent: May 17, 2022

(54) DUAL PORT BATTERY CHARGING SYSTEM AND THE METHOD THEREOF

(71) Applicant: PHIHONG TECHNOLOGY CO., LTD., Taoyuan (TW)

(72) Inventors: Ming-Huang Hung, Taoyuan (TW); Yi-Tun Wang, Taoyuan (TW); Mu-Hsun Chen, Taoyuan (TW)

(73) Assignee: PHIHONG TECHNOLOGY CO., LTD., Taoyuan (TW)

( * ) Notice: Subject to any disclaimer, the term of this patent is extended or adjusted under 35 U.S.C. 154(b) by 190 days.

(21) Appl. No.: 16/854,965

(22) Filed: Apr. 22, 2020

(65) Prior Publication Data
US 2021/0305837 A1    Sep. 30, 2021

(30) Foreign Application Priority Data

Mar. 25, 2020  (TW) ................................ 109110079

(51) Int. Cl.
*H02J 7/00* (2006.01)
*H01M 10/44* (2006.01)
*H01M 10/0525* (2010.01)

(52) U.S. Cl.
CPC ..... *H02J 7/007182* (2020.01); *H01M 10/441* (2013.01); *H02J 7/0019* (2013.01); *H02J 7/00714* (2020.01); *H01M 10/0525* (2013.01)

(58) Field of Classification Search
CPC . H02J 7/007182; H02J 7/0019; H01M 10/441
USPC ........................................................ 320/107
See application file for complete search history.

(56) References Cited

U.S. PATENT DOCUMENTS

| | | | | | |
|---|---|---|---|---|---|
| 5,355,071 | A | * | 10/1994 | Ishida | H02J 7/1423 320/110 |
| 5,412,306 | A | * | 5/1995 | Meadows | H02J 7/0086 320/160 |
| 5,532,524 | A | * | 7/1996 | Townsley | G06F 1/26 307/64 |
| 6,037,747 | A | * | 3/2000 | Chalasani | H02J 7/0091 320/125 |
| 6,160,379 | A | * | 12/2000 | Chalasani | H02J 7/0069 320/133 |

(Continued)

FOREIGN PATENT DOCUMENTS

JP   H02179229 A  *  7/1990
JP   H0714260 B2  *  2/1995

OTHER PUBLICATIONS

"Advantages of MOSFET", RFWirelessWorld, found online Jan. 29, 2020, www.rfwireless-world.com/Terminology/Advantages-and-Disadvantages-of-MOSFET.html (Year: 2020).*

*Primary Examiner* — John T Trischler
(74) *Attorney, Agent, or Firm* — WPAT, PC

(57) ABSTRACT

A dual port battery charging system comprises a charger, a microcontroller, a first switching unit, a second switching unit, a first charging interface and a second charging interface, wherein the microcontroller is coupled with the first switching unit, the second switching unit, the first charging interface and the second charging interface to detect a voltage and a current of a first battery pack or a second battery pack, and the microcontroller can control the first switching unit and the second switching unit to charge the first battery pack and the second battery pack separately or alternately.

18 Claims, 6 Drawing Sheets

(56) References Cited

U.S. PATENT DOCUMENTS

| | | | | |
|---|---|---|---|---|
| 6,175,211 B1* | 1/2001 | Brotto | | H02J 7/00 320/110 |
| 6,362,596 B1* | 3/2002 | Brotto | | H02J 7/00 320/155 |
| 6,377,027 B2* | 4/2002 | Takemoto | | H02M 3/158 320/135 |
| 6,462,511 B1* | 10/2002 | Kwok | | B60L 58/18 320/141 |
| 6,504,341 B2* | 1/2003 | Brotto | | H02J 7/00047 320/106 |
| 6,747,436 B2* | 6/2004 | Brotto | | H01M 10/46 320/110 |
| 6,850,039 B2* | 2/2005 | Popescu | | H01M 10/441 320/134 |
| 7,915,859 B2* | 3/2011 | Kim | | H02J 7/0016 320/126 |
| 7,977,915 B2* | 7/2011 | Gilmore | | H02J 7/0063 320/124 |
| 8,148,942 B2* | 4/2012 | Densham | | H02J 7/0018 320/116 |
| 8,228,032 B2* | 7/2012 | Bai | | H02J 7/0016 320/118 |
| 8,294,421 B2* | 10/2012 | Bucur | | H02J 7/0019 320/116 |
| 8,598,844 B2* | 12/2013 | Densham | | H02J 7/0018 320/116 |
| 8,643,334 B2* | 2/2014 | Kuo | | H02J 7/0019 320/122 |
| 8,729,865 B2* | 5/2014 | Scheucher | | H01M 10/625 320/134 |
| 9,007,015 B1* | 4/2015 | Nook | | H02J 7/0034 320/105 |
| 9,030,167 B2* | 5/2015 | Yamaguchi | | H01M 10/441 320/119 |
| 9,130,378 B2* | 9/2015 | Densham | | H02J 7/0018 |
| 9,160,185 B2* | 10/2015 | Potts | | B60L 58/15 |
| 9,219,366 B2* | 12/2015 | Kim | | H02J 3/32 |
| 9,263,898 B1* | 2/2016 | Ghazarian | | H02J 7/342 |
| 9,413,185 B2* | 8/2016 | Kim | | H02J 7/0014 |
| 9,419,446 B2* | 8/2016 | Pickens | | H02J 7/0003 |
| 9,461,482 B2* | 10/2016 | Cheng | | H02J 7/0003 |
| 9,478,990 B2* | 10/2016 | Moon | | H02J 3/32 |
| 9,705,343 B2* | 7/2017 | Yamamoto | | H01M 10/482 |
| 9,755,440 B2* | 9/2017 | Ishibashi | | H02J 7/0018 |
| 9,770,992 B2* | 9/2017 | Nook | | H02J 7/0047 |
| 9,837,811 B2* | 12/2017 | Yamaguchi | | H01M 10/48 |
| 9,865,901 B2* | 1/2018 | Hwang | | H02J 7/0014 |
| 9,906,053 B2* | 2/2018 | Chen | | H02M 3/1588 |
| 9,912,017 B1* | 3/2018 | Kuo | | H02J 7/0021 |
| 10,027,144 B2* | 7/2018 | Chen | | H02J 7/0027 |
| 10,116,151 B2* | 10/2018 | Seng | | H02J 7/0042 |
| 10,168,551 B2* | 1/2019 | Blum | | G02C 7/081 |
| 10,193,366 B2* | 1/2019 | Josephs | | H02J 7/0048 |
| 10,218,204 B2* | 2/2019 | Chen | | H02J 7/04 |
| 10,222,633 B2* | 3/2019 | Blum | | G02C 11/10 |
| 10,236,698 B2* | 3/2019 | Chen | | H02J 7/345 |
| 10,243,377 B2* | 3/2019 | Clark | | H01R 24/66 |
| 10,272,791 B2* | 4/2019 | Chen | | B60L 53/305 |
| 10,312,553 B2* | 6/2019 | Kubota | | H01M 10/46 |
| 10,328,808 B2* | 6/2019 | Nook | | B60L 53/14 |
| 10,355,488 B2* | 7/2019 | Moon | | H02J 13/0017 |
| 10,374,441 B2* | 8/2019 | Wang | | H02J 7/0018 |
| 10,374,445 B2* | 8/2019 | Wang | | H02J 7/0021 |
| 10,461,545 B2* | 10/2019 | Inoue | | B60L 58/12 |
| 10,530,290 B2* | 1/2020 | Janik | | G06Q 10/06312 |
| 10,604,024 B2* | 3/2020 | Nook | | H02J 7/0047 |
| 10,752,119 B2* | 8/2020 | Chen | | H02J 7/0013 |
| 10,897,145 B2* | 1/2021 | De Breucker | | H02J 7/0021 |
| 10,910,859 B2* | 2/2021 | Frost | | H02J 7/00711 |
| 10,971,764 B2* | 4/2021 | Gao | | H02J 7/0013 |
| 10,981,452 B2* | 4/2021 | Nook | | B60L 3/0046 |
| 10,988,049 B2* | 4/2021 | Wang | | B60L 58/21 |
| 11,146,094 B2* | 10/2021 | Ohashi | | H02J 7/34 |
| 11,217,833 B1* | 1/2022 | Hom | | H01M 10/425 |
| 2001/0013767 A1* | 8/2001 | Takemoto | | H02J 7/0013 320/132 |
| 2002/0074973 A1* | 6/2002 | Brotto | | H02J 7/00 320/150 |
| 2003/0062872 A1* | 4/2003 | Brotto | | H02J 7/00047 320/106 |
| 2004/0217737 A1* | 11/2004 | Popescu | | H02J 7/0013 320/128 |
| 2005/0142434 A1* | 6/2005 | Nguyen | | H02J 7/0031 429/61 |
| 2006/0022635 A1* | 2/2006 | Li | | H02J 7/02 320/107 |
| 2006/0267551 A1* | 11/2006 | Sutardja | | H02J 7/0013 320/116 |
| 2007/0216355 A1* | 9/2007 | Kim | | H02J 7/0024 320/128 |
| 2009/0134841 A1* | 5/2009 | Gilmore | | H01M 10/482 320/118 |
| 2009/0278497 A1* | 11/2009 | Kim | | H02J 7/0016 320/126 |
| 2010/0013432 A1* | 1/2010 | Toya | | H02J 50/90 320/108 |
| 2010/0225275 A1* | 9/2010 | Bucur | | H02J 7/0019 320/116 |
| 2011/0101916 A1* | 5/2011 | Densham | | H02J 7/0018 320/116 |
| 2012/0038323 A1* | 2/2012 | Densham | | H02J 7/0018 320/137 |
| 2012/0080941 A1* | 4/2012 | Scheucher | | B60L 50/64 307/18 |
| 2012/0086404 A1* | 4/2012 | Lim | | H02J 7/0029 320/128 |
| 2012/0146588 A1* | 6/2012 | Ishibashi | | H02J 7/0018 320/138 |
| 2012/0262121 A1* | 10/2012 | Kuo | | H02J 7/0019 320/128 |
| 2012/0313439 A1* | 12/2012 | Yamaguchi | | H01M 10/465 307/71 |
| 2012/0319652 A1* | 12/2012 | Namou | | H02J 1/108 320/116 |
| 2013/0141828 A1* | 6/2013 | Yamaguchi | | H01M 10/44 361/86 |
| 2013/0187605 A1* | 7/2013 | Potts | | B60L 58/22 320/112 |
| 2013/0307479 A1* | 11/2013 | Kim | | H02J 7/0022 320/112 |
| 2013/0342018 A1* | 12/2013 | Moon | | H02J 3/46 307/80 |
| 2014/0002003 A1* | 1/2014 | Kim | | H01M 10/441 320/103 |
| 2014/0084871 A1* | 3/2014 | Densham | | H02J 7/0018 320/119 |
| 2014/0266049 A1* | 9/2014 | Benckenstein, Jr. | | H02J 7/0026 320/112 |
| 2015/0035492 A1* | 2/2015 | Nomura | | H02J 7/007 320/126 |
| 2015/0130404 A1* | 5/2015 | Luo | | H01M 10/441 320/137 |
| 2015/0155602 A1* | 6/2015 | Hwang | | H01M 10/4207 429/61 |
| 2015/0244190 A1* | 8/2015 | Yamamoto | | H02J 7/0014 320/126 |
| 2015/0318716 A1* | 11/2015 | Pickens | | H02J 7/00 320/110 |
| 2015/0357843 A1* | 12/2015 | Kobayashi | | H02J 7/0016 320/118 |
| 2016/0001666 A1* | 1/2016 | Nook | | H02J 7/0029 320/105 |
| 2016/0204625 A1* | 7/2016 | Josephs | | H02J 7/0021 320/139 |
| 2017/0012434 A1* | 1/2017 | Moon | | H02J 3/40 |
| 2017/0075141 A1* | 3/2017 | Blum | | G02C 5/146 |
| 2017/0085103 A1* | 3/2017 | Seng | | H02J 7/00 |
| 2017/0098940 A1* | 4/2017 | Syouda | | G01R 31/3835 |
| 2017/0141589 A1* | 5/2017 | Inoue | | H02J 7/34 |

(56) References Cited

U.S. PATENT DOCUMENTS

| | | | | |
|---|---|---|---|---|
| 2017/0214246 A1* | 7/2017 | Wang | | H02J 3/322 |
| 2017/0358938 A1* | 12/2017 | Chen | | H02J 7/342 |
| 2017/0366024 A1* | 12/2017 | Chen | | G01F 23/263 |
| 2018/0019601 A1* | 1/2018 | Wang | | H02J 7/0048 |
| 2018/0050600 A1* | 2/2018 | Chen | | B60L 53/00 |
| 2018/0111491 A1* | 4/2018 | Nook | | B60L 53/14 |
| 2018/0178662 A1* | 6/2018 | Chen | | B60L 53/00 |
| 2018/0191171 A1* | 7/2018 | Chen | | H02J 7/0077 |
| 2018/0215274 A1* | 8/2018 | Nook | | B60L 53/14 |
| 2018/0233787 A1* | 8/2018 | Kubota | | H01M 10/425 |
| 2018/0241239 A1* | 8/2018 | Frost | | G06F 17/16 |
| 2019/0013680 A1* | 1/2019 | Zheng | | H02J 7/0019 |
| 2019/0288534 A1* | 9/2019 | Gao | | H01M 10/425 |
| 2019/0308518 A1* | 10/2019 | Nook | | H02J 7/0029 |
| 2019/0356157 A1* | 11/2019 | Ohashi | | H02J 7/0029 |
| 2020/0028368 A1* | 1/2020 | Nook | | H02J 7/0021 |
| 2020/0083733 A1* | 3/2020 | Chang | | H02J 7/007182 |
| 2020/0215926 A1* | 7/2020 | Nook | | H02J 7/0047 |
| 2020/0235439 A1* | 7/2020 | Frost | | H02J 7/0016 |
| 2020/0259340 A1* | 8/2020 | Nook | | H02J 7/0034 |
| 2020/0274371 A1* | 8/2020 | Kirleis | | B60L 58/19 |
| 2020/0317068 A1* | 10/2020 | Nook | | H02J 7/0034 |
| 2020/0361340 A1* | 11/2020 | Wang | | B60L 58/18 |
| 2021/0006081 A1* | 1/2021 | Tan | | H01M 10/443 |
| 2021/0036544 A1* | 2/2021 | Cao | | G06F 1/20 |
| 2021/0066946 A1* | 3/2021 | Hung | | H02J 7/007182 |
| 2021/0155096 A1* | 5/2021 | Nook | | H02J 7/0016 |
| 2021/0245622 A1* | 8/2021 | Wang | | G01R 31/382 |
| 2022/0077710 A1* | 3/2022 | Sung | | H02J 7/0029 |

\* cited by examiner

DUAL PORT BATTERY CHARGING SYSTEM AND THE METHOD THEREOF

CROSS-REFERENCE STATEMENT

The present application is based on, and claims priority from, Taiwan Patent Application Serial Number 109110079, filed Mar. 25, 2020, the disclosure of which is hereby incorporated by reference herein in its entirety.

TECHNICAL FIELD

The present invention relates to a battery charger, especially relates to a dual port battery charging system for battery pack and the method thereof, so as to realize the technology of charging a dual battery pack.

RELATED ARTS

With the increasing variety of batteries, they are widely used in electric vehicles, electric tools, video games, laptops, photovoltaic, small portable electronic equipment and electronic appliances. Battery charger is an electronic device for charging rechargeable batteries. Nowadays, the widely used battery charger is a single port charger for charging a single rechargeable battery. However, many devices usually need to be equipped with two or more batteries to get a long endurance.

In addition, a common electronic product is equipped with a rechargeable battery, and it is necessary to charge the battery of the electronic product repeatedly. As the charger is not well designed, it will not only consume more power in the process of charging, but also cause irreparable damage to the electronic product and its battery due to excessive voltage or current. Therefore, with the development of electronic products, it becomes more and more important for chargers and their charging methods.

Therefore, based on the demand in the current market, and improving the disadvantages of conventional technology, the invention proposes a new battery charging system for battery packs and the method thereof.

SUMMARY

According to one aspect of the invention, a charging system of dual port battery packs comprises a charger, a microcontroller unit; a first switching unit coupled to the charger and the microcontroller unit; a second switching unit coupled to the charger and the microcontroller unit; a first charging interface coupled to the first switching unit and the microcontroller unit; and a second charging interface coupled to the second switching unit and the microcontroller unit; wherein the microcontroller unit is used to detect a voltage and a current of a first battery pack or a second battery pack and control the first switching unit and the second switching unit to charge the first battery pack and the second battery pack separately or in turn.

The microcontroller unit includes an analog-to-digital converter to detect the voltage and the current of the first battery pack or the second battery pack. The first switching unit and the second switching unit are a metal oxide semiconductor (MOS) device. The microcontroller unit is used to control the first switching unit and the second switching unit to current-equalization charge the first battery pack and the second battery pack. The system further comprises a selector to select a charging mode of the first battery pack and the second battery pack.

According to another aspect of the invention, a charging method of a battery charging system comprises providing a plurality of battery charging sockets. Then, each of a plurality of battery packs is plugged into a corresponding one of the battery charging sockets. Next, a voltage and a charging current of each of the plurality of battery packs are detected by a microcontroller unit. Finally, a current-equalization charging each of the plurality of battery packs by a charger is performed based on charging clock rate controlled by the microcontroller unit.

The microcontroller unit includes an analog-to-digital converter to detect the voltage and the charging current of each of the plurality of battery packs. The microcontroller unit is used to control multiple switching units to current-equalization charge each of the plurality of battery packs. As the microcontroller unit detects a voltage difference between each of the plurality of battery packs within a preset tolerance, each of the plurality of battery packs is current-equalization charged.

The above description is used to explain the purpose, technical means and the achievable effect of the invention. Those familiar with the technology in the relevant field can understand the invention more clearly through the following embodiments, the accompanying description of the drawings and claims.

BRIEF DESCRIPTION OF THE DRAWINGS

The present invention can be understood by utilizing several preferred embodiments in the specification, the detailed description and the following drawings. The same element symbols in the drawings refer to the same elements in the present invention. However, it should be understood that all preferred embodiments of the present invention are only used for illustrative purposes, and not intended to limit the scope of the application.

DETAILED DESCRIPTION

In order to give examiner more understanding of the features of the present invention and advantage effects which the features can be achieve, some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

The present invention provides a dual port charger and a charging method thereof. The dual port charger has dual charging sockets to charge individual battery directly.

The invention may adopt a general constant voltage charger and a dual port circuit board, which can achieve the purpose of charging a single battery pack or two battery packs. Dual port charger is performing pulse charging and current-equalization charging to achieve the purpose of low-cost and efficiently charging. In addition, the invention can support a single port fast charging or multi-ports current-equalization charging.

The dual port charger of the invention has a dual battery charging sockets, dual charging modes for a dual battery pack charging. The dual charging modes are selected through a charging mode selector. Either of the dual charging modes can be selected by pressing the charging mode selector. The first mode is dual battery pack charging in a pre-determined period of time, and the second mode is that another battery pack is charged as one battery pack is charged completely. A power detection unit detects the remaining power of the dual battery pack.

Figure 1:
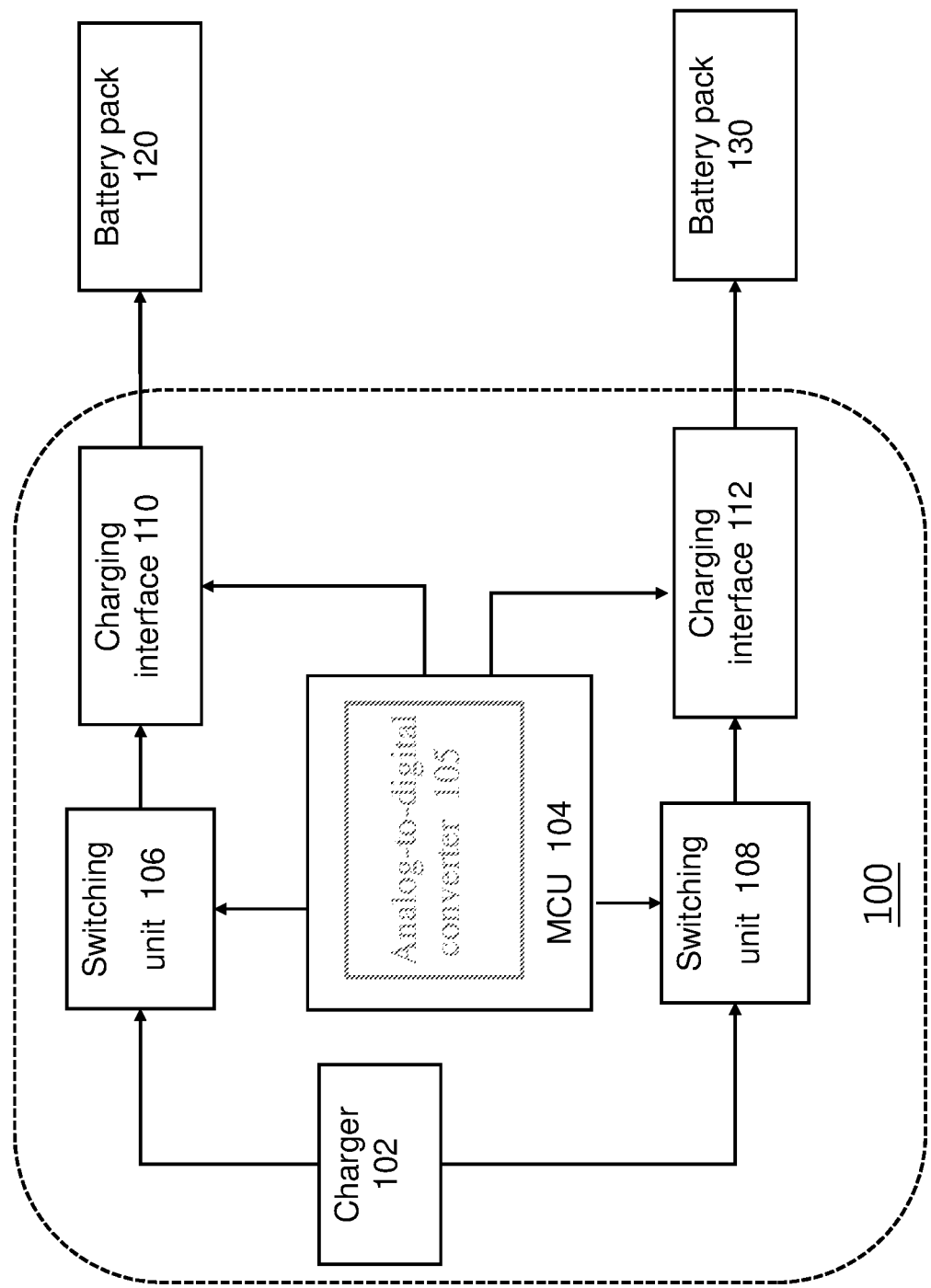
FIG. 1 shows a functional block diagram of a charging system of dual port battery packs of the present invention.

Please refer to FIG. 1, it shows a functional block diagram of a charging system of dual port battery packs of the present invention. In this embodiment, the dual port battery charging system 100 includes a charger 102, a microcontroller unit (MCU) 104, a switching unit 106, a switching unit 108, a charging interface 110 and a charging interface 112. In this embodiment, the charger 102 is electrically coupled to the switching unit 106 and the switching unit 108, and the microcontroller unit 104 is electrically coupled to the switching unit 106 and the switching unit 108. The charging interface 110 is electrically coupled to the switching unit 106 and the microcontroller unit 104, and the charging interface 112 is electrically coupled to the switching unit 108 and the microcontroller unit 104. In one embodiment, the battery pack 120 and the battery pack 130 are independent and detachable rechargeable batteries, which are not arranged on a control board, a main circuit board or a power supply system. Rechargeable batteries may include lithium-ion batteries, nickel cadmium batteries, nickel hydrogen batteries, lithium polymer batteries, or lead batteries, etc. The charging interface 110 and the charging interface 112 are charging ports. In one embodiment, the charging interface 110 and the charging interface 112 may be Universal Serial Bus (USB), type-C or any interface capable of being connected to the power conversion unit. The dual port battery charging system 100 includes two charging sockets (bases) to receive two battery packs respectively, and the two battery packs are connected to charge through the two battery charging ports respectively.

In one embodiment, the microcontroller unit 104 is integrated with the components with functions of storing and operation, including a microprocessor (CPU), a memory (Random Access Memory: RAM, Read-Only Memory: ROM), input/output (I/O), and an analog-to-digital converter (ADC). The microcontroller unit 104 includes an analog-to-digital converter (ADC) to directly measure external simulated (analog) signals (such as voltage, current of battery pack, etc.), and complete the conversion from analog to digital through data sampling and data conversion. In one embodiment, the microcontroller unit 104 is configured on the control board.

In one embodiment, the microcontroller unit 104 or a voltage detection unit includes two sets of independent voltage detection circuits (analog-to-digital converter: ADC), which are electrically coupled to the charging interface 110 and the charging interface 112 to detect the voltage between a cathode (negative) terminal and an anode (positive) terminal of the battery pack 120 and the battery pack 130, respectively. In another embodiment, the microcontroller unit 104 or a voltage detection unit includes a voltage detection circuit (analog to digital converter: ADC) electrically coupled to the charging interface 110 and the charging interface 112 to detect the voltage between a cathode (negative) terminal and an anode (positive) terminal of the battery pack 120 or the battery pack 130.

In one embodiment, the microcontroller unit 104 or a current detection unit includes two sets of independent current detection circuits (analog to digital converter: ADC), which are electrically coupled to the charging interface 110 and the charging interface 112 to detect the charging current of the battery pack 120 and the battery pack 130, respectively. In another embodiment, the microcontroller unit 104 or a current detection unit includes a current detection circuit (analog to digital converter: ADC) electrically coupled to the charging interface 110 and the charging interface 112 to detect the charging current of the battery pack 120 or the battery pack 130.

In one embodiment, the charger 102 is electrically coupled to the microprocessor unit 104, wherein the microprocessor unit 104 is used to control charging status and charging condition of the charger 102.

In one embodiment, the switching unit 106 is a metal oxide semiconductor (MOS) device Q1, and the switching unit 108 is a metal oxide semiconductor (MOS) device Q2. The microprocessor unit 104 is used as a controller to drive the metal oxide semiconductor (MOS) devices Q1 and Q2.

Figure 2:
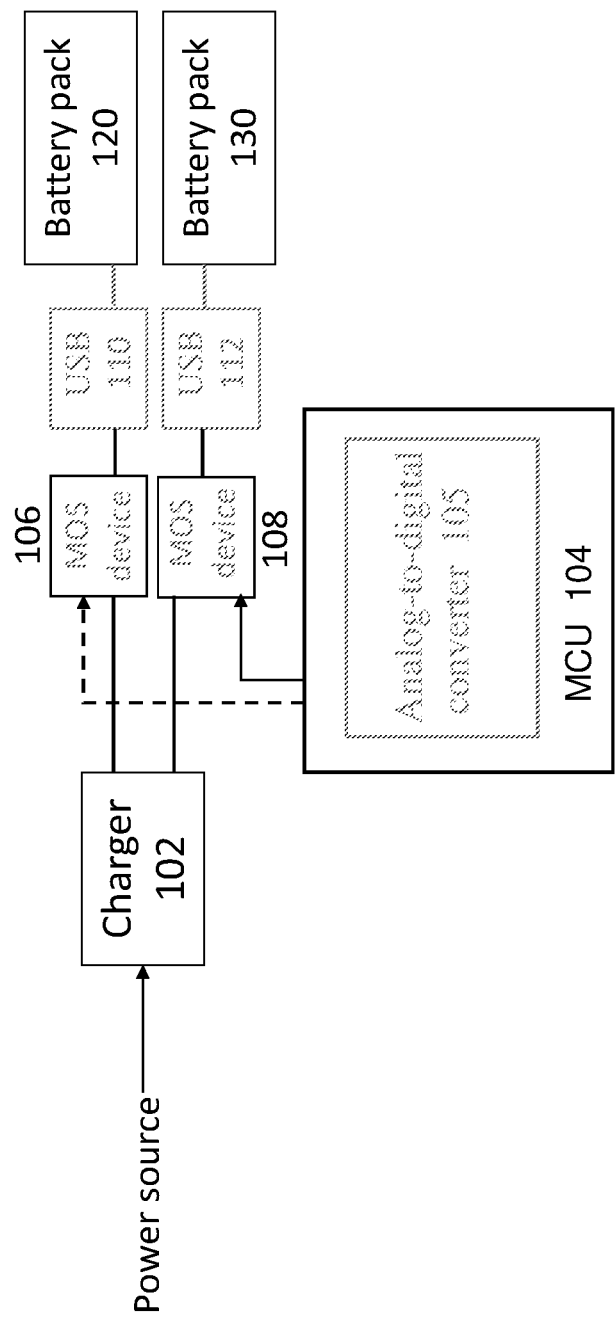
FIG. 2 shows an external power supply to charge dual port battery packs of the present invention.

In one embodiment, the charger 102 is a constant voltage charger for charging a single battery pack or two battery packs. As shown in FIG. 2, take a 50 W (Watts) dual port charger 102 as an example, an external power supply is provided to the charger 102, for example, the charger 102 is plugged into an appropriate outlet. The external power supply can be an alternating current (AC) power supply or a direct current (DC) power supply, and its power source can be the power provided by municipal power or generated by other commercial or civil generators. Then, one or two battery packs may be slid into the charging socket (stand) of the charger 102. Normally, the relevant indication lights will flash in green color showing the battery pack is being charged.

Figure 3:
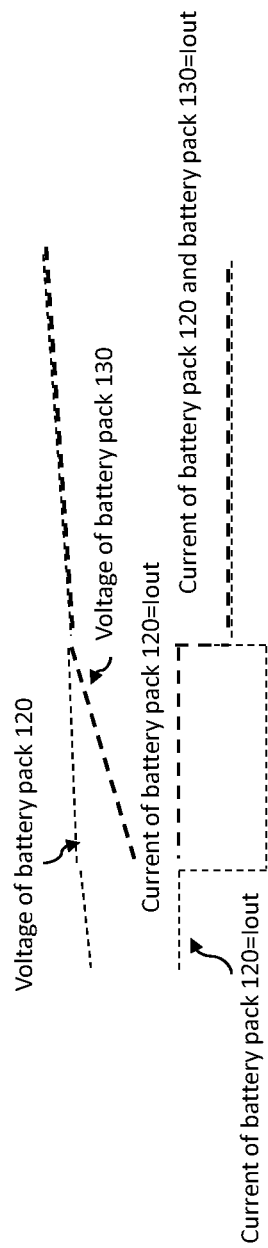
FIG. 3 shows a detection chart of a voltage and a charging current of dual port battery packs of the present invention.
Figure 4:
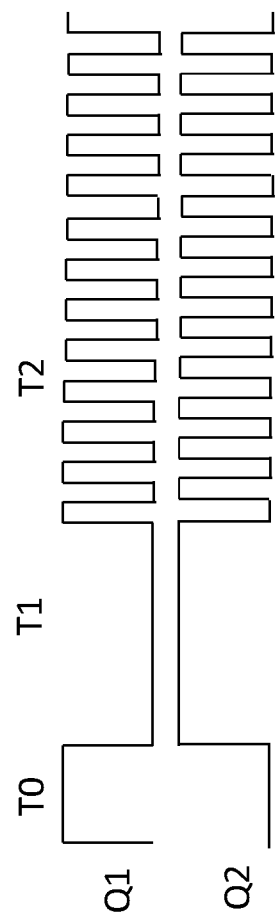
FIG. 4 shows a clock of charging of dual port battery packs of the present invention.

The voltage and the charging current of the battery pack 120 or the battery pack 130 are detected through an analog to digital converter (ADC) of the microcontroller unit 104, as shown in FIG. 3 and FIG. 4. Among them, in the dual battery packs charging mode, when the two battery packs are charged at the same period of time, the charger is charging to the two battery packs. For example, a voltage and a charging current of the battery pack 120 and a voltage and a charging current of the battery pack 130 are confirmed in time period T0 and time period T1, respectively. In the time period T0, the voltage and the charging current of the battery pack 120 is confirmed; in time period T1, the voltage and the charging current of the battery pack 130 is confirmed. When the voltage difference between the battery pack 120 and the battery pack 130 is within the preset tolerance, the metal oxide semiconductor (MOS) devices Q1 and Q2 are turned on, in alternate order during the time period T2 and the battery pack 120 and the battery pack 130 are charged by current-equalization. The clock of charging is shown in FIG. 4. Normally, the same type of dual battery packs can be fully charged at the same time period. That is to say, in the dual battery packs charging mode, two battery packs have the same capacity and the two switching units are switched at the same frequency, and the duty ratio is 1:1. For example, taking the switching frequency of 1 kHz as an example, the duty ratio of switching Q1 is 50%, and the duty ratio of switching Q2 is 50%. The pulse charging method is performed to achieve a current equipartition charging, and the dual battery packs are charged in alternate order, in which each battery pack can equally share the charging current (1/2 Iout). In the pulse charging method, for example, the microcontroller unit is used to provide time and frequency of the pulse to control the switching frequency of the switching unit. The control strategy of the microcontroller unit of the invention is switching a corresponding switching unit with the same frequency, and the duty ratio of switching Q1 and Q2 for battery packs with the same capacity is the same, while the duty ratio of switching Q1 and Q2 for battery packs with different capacity is different (proportioned to the capacity of battery pack).

In a one-by-one (single battery pack) charging mode, the charger is charging to the battery pack 120 or the battery pack 130, respectively. For example, the charger 120 charges the battery pack with a higher residual capacity until fully charged, and then the charger 120 charges the other battery pack. In other words, in one-to-one charging mode, it can reduce waiting time as one battery pack is completely charging first.

Figure 5:
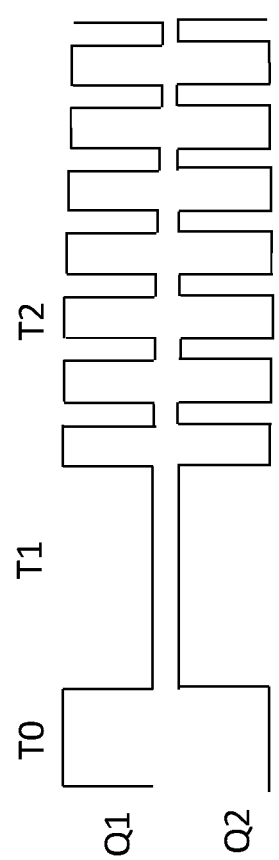
FIG. 5 shows a clock of charging of dual port battery packs according to another embodiment of the present invention.
Figure 6:
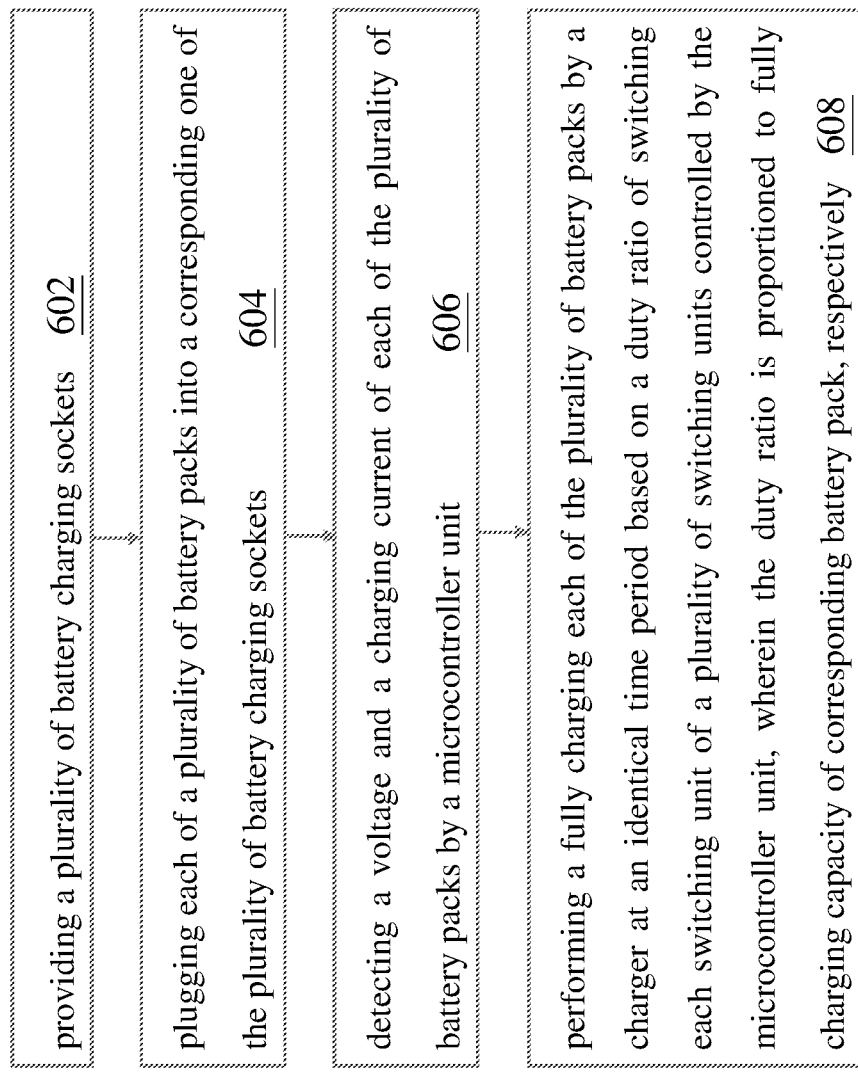

In another embodiment, for different types of dual battery packs, they have different full charging capacity, for example, the proportion of full charging capacity is 2:1. In the dual battery packs charging mode, the pulse charging method is also used for charging, and the two switching units are switched at the same frequency wherein the duty ratio is 2:1. For example, taking the switching frequency of 1 kHz as an example, the duty ratio of switching Q1 is 66.6 (200/3)%, and the duty ratio of switching Q2 is 33.3 (100/3)%. Therefore, one battery pack obtains 2/3 of charging current (2/3 Iout), while the other battery pack obtains 1/3 of the charging current (1/3 Iout), as shown in FIG. 5. In this way, the two battery packs can be fully charged at the same time period.

In another embodiment, when three (or more) same type battery packs (with identical capacity) are charged, the three switching units are switched at the same frequency wherein the duty ratio is 1:1:1. For example, taking the switching frequency of 1 kHz as an example, the duty ratio of switching a first switching unit is 33.3 (100/3)%, the duty ratio of switching a second switching unit is 33.3 (100/3)% and the duty ratio of switching a third switching unit is 33.3 (100/3)%. The pulse charging method can also be used to achieve current equipartition charging, so that multiple battery packs can be charged in turn, in which each battery pack can equally share the charging current (1/3 Iout or 1/N Iout, N is integer) to achieve full charging at the same time period. In order to charge multiple battery packs, the corresponding battery charging ports and charging sockets (stands) are needed for connecting to the multiple battery packs, respectively.

Based on the above-mentioned description of this invention, a charging method of a battery charging system is provided to include the following steps. Firstly, in the step 602, it provides a plurality of battery charging sockets. Next, the step 604 of the method is to perform for plugging each of a plurality of battery packs into a corresponding one of the plurality of battery charging sockets. Then, in the step 606, it performs a step of detecting a voltage and a charging current of each of the plurality of battery packs by a microcontroller unit. Finally, in the step 608, a fully charging each of the plurality of battery packs is performed by a charger at an identical time period based on a duty ratio of switching each switching unit of a plurality of switching units controlled by the microcontroller unit, wherein the duty ratio is proportioned to fully charging capacity of corresponding battery pack, respectively.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs that are not illustrated or described. The illustrated elements or components may also be arranged in different arrangements or orders, including the reordering of any fields or the modification of field sizes.

What is claimed is:

1. A charging system of dual port battery packs, comprising:
   a constant voltage charger;
   a microcontroller unit;
   a first switching unit coupled to said charger and said microcontroller unit;
   a second switching unit coupled to said charger and said microcontroller unit;
   a first charging interface coupled to said first switching unit and said microcontroller unit; and
   a second charging interface coupled to said second switching unit and said microcontroller unit; and
   wherein said microcontroller unit is used to detect a voltage and a current of a first battery pack or a second battery pack and control a first duty ratio of switching said first switching unit and a second duty ratio of switching said second switching unit, wherein said first battery pack and said second battery pack are independent and detachable rechargeable batteries without arranging on a power supply system and charged in alternate order to share an output charging current of said constant voltage charger based on a first switching frequency of said first switching unit and a second switching frequency of said second switching unit, wherein said first duty ratio and said second duty ratio are proportioned to a first charging capacity of said first battery pack and a second charging capacity of said second battery pack, respectively.

2. The system of claim 1, wherein said microcontroller unit includes an analog-to-digital converter to detect said voltage and said current of said first battery pack or said second battery pack.

3. The system of claim 1, further comprising a first charging socket and a second charging socket to be plugged by said first battery pack and said second battery pack, respectively.

4. The system of claim 1, wherein said first charging interface is Universal Serial Bus (USB) interface.

5. The system of claim 1, wherein said second charging interface is Universal Serial Bus (USB) interface.

6. The system of claim 1, wherein said first battery pack or said second battery pack includes a lithium-ion battery, a nickel cadmium battery, a nickel hydrogen battery, a lithium polymer battery or a lead battery.

7. The system of claim 1, wherein said first switching unit is a metal oxide semiconductor (MOS) device.

8. The system of claim 7, wherein said second switching unit is a metal oxide semiconductor (MOS) device.

9. The system of claim 8, wherein said microcontroller unit is used to control said first switching unit and said second switching unit to current-equalization charge said first battery pack and said second battery pack.

10. The system of claim 9, wherein said microcontroller unit includes an analog-to-digital converter to detect said voltage and said current of said first battery pack and said second battery pack.

11. A charging method of a battery charging system, comprising:
providing a plurality of battery charging sockets;
plugging each of a plurality of battery packs into a corresponding one of said plurality of battery charging sockets;
detecting a voltage and a charging current of each of said plurality of battery packs by a microcontroller unit; and
performing a charging each of said plurality of independent and detachable rechargeable battery packs in alternate order to share an output charging current by a constant voltage charger based on a switching frequency of each switching unit of a plurality of switching units controlled by said microcontroller unit, wherein a duty ratio is proportioned to capacity of corresponding said battery pack, respectively.

12. The method of claim 11, wherein said microcontroller unit includes an analog-to-digital converter to detect said voltage and said charging current of each of said plurality of battery packs.

13. The method of claim 11, wherein said microcontroller unit is used to control said plurality of switching units to current-equalization charge each of said plurality of battery packs.

14. The method of claim 13, wherein each of said plurality of switching units is a metal oxide semiconductor (MOS) device.

15. The method of claim 13, wherein each of said plurality of battery packs includes a lithium-ion battery, a nickel cadmium battery, a nickel hydrogen battery, a lithium polymer battery or a lead battery.

16. The method of claim 11, wherein said microcontroller unit detects a voltage difference between each of said plurality of battery packs within a preset tolerance, each of said plurality of battery packs is current-equalization charged.

17. The method of claim 16, wherein each of said plurality of switching units is a metal oxide semiconductor (MOS) device.

18. The method of claim 16, wherein each of said plurality of battery packs includes a lithium-ion battery, a nickel cadmium battery, a nickel hydrogen battery, a lithium polymer battery or a lead battery.

* * * * *